March 28, 1939. R. G. JACKSON Re. 21,036

FLOOR COVERING

Original Filed May 26, 1926

Inventor

Ralph G. Jackson

By Stone, Boydon, Mack & Hahn

Attorneys

Reissued Mar. 28, 1939

Re. 21,036

UNITED STATES PATENT OFFICE 21,036

FLOOR COVERING

Ralph G. Jackson, Woodbury, N. J.

Original No. 1,729,833, dated October 1, 1929, Serial No. 111,769, May 26, 1926. Application for reissue September 29, 1931, Serial No. 565,911

11 Claims. (Cl. 91—68)

This invention relates to floor coverings and to a process of making the same.

The floor covering provided by the present invention is of that general type known as "smooth surface" coverings, such as linoleum and felt base floor coverings having decorative paint coats, and the invention is an improvement over such materials known as bitumen impregnated felt base coverings, linoleums, oil cloth and the like.

One purpose of the present invention is to provide a decorative floor covering of the smooth surface type in which the decorative effects, patterns, and designs are applied directly to the material of the wear sheet and penetrate it part or all the way through the thickness thereof from top to bottom. One feature of the invention is that the covering possesses tensile strength to a pronounced degree, and may be handled similarly to the usual smooth surface floor covering.

One advantageous feature of the product of this invention is the provision in a single continuous ply or layer of floor covering of decorative effects similar in appearance to those used in linoleums and felt base goods, but having superior wearing quality due to the fact that the design extends into the base. This latter quality is in contrast to decorative effects which are merely painted on the surface or printed with paint on the surface. The product possesses the appearance of linoleum and is susceptible to treatment to produce much finer and more delicate designs than is possible in the manufacture of linoleum type goods. Unlike linoleum, the entire decorative portion possesses strength and wearing qualities as a sheet and does not require a supporting base of fabric, such as the known burlap base used with linoleum. Another advantage in the product resides in the fact that the covering has tensile strength, even greater than the bitumen impregnated felt base covering, and in contrast to such latter, the present product has its decorative effects extending into the thickness instead of being applied by painting or printing and remaining on the surface, as is common in felt base goods.

Another feature of the invention resides in the steps of the process, in accordance with which the covering is prepared. By the procedure specified, time is saved as compared to the time required for preparing a linoleum or bitumen felt base covering. Tedious drying operations are substituted by quickly conducted steps, and consequently drying apparatus and space is conserved. The number of steps is reduced to a minimum, and consists chiefly of first, decorating the absorbent sheet, such as dry floor covering felt, and preferably preventing the coloring material from spreading from the zone undergoing decoration to the next zone which latter may be given a different color at the same time or at some subsequent period of treatment, secondly, drying the sheet thus decorated, thirdly, saturating the decorated sheet throughout with a transparent saturant, such as a cellulose ester solution, or the like; and fourthly, drying the saturated sheet. The first phase of this treatment may be accomplished in several ways, as for example, by first applying all of one color of the design and definitely outlining the decorative figure thereof with either the same color of which the figure is to be made, or with a different color, and then after one color has been applied proceeding to apply all of another color belonging to the design and permitting the other design colors to extend up to this outline which has already been first laid out. Another method of control can be invoked by using for the printing block or typed means what are known as "felt blocks" as known in wall paper printing and by which equipment the pattern figure is formed in a felt surface to be carried by a printing machine and for each marginal edge of every color and figure of the design there is an outline or narrow wall of rigid brass embracing the felt blocks, so that when pressure is applied on the floor covering by means of the felt blocks carrying the color medium the brass outline wall compresses the floor covering sheet or goods to some extent, and the ink or dye is transferred from the felt blocks to the floor covering receiving surface and penetrates into the floor covering and spreads laterally to the line of the impression formed by the brass outline and there it stops within the confines of the outlined figure. Another method of controlling the application of the color or decorative medium may be effected by using a solution of different consistency on blocks or figures that join each other. Still another method may be followed by using water color on one block and an oil color on another block, which results in printed colors the materials of which do not mix.

The above and additional advantages and details are described and claimed in the following specification and claims and the structure is illustrated in the accompanying drawing, in which:

Figure 1:
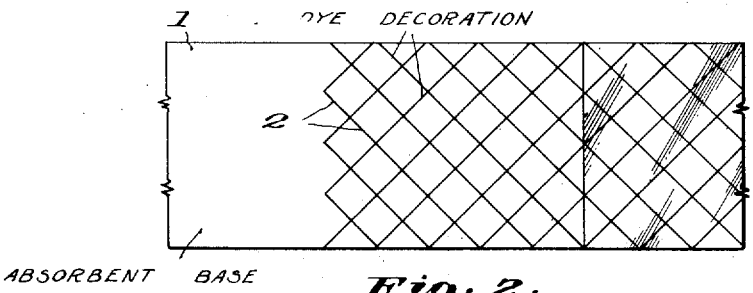
Figure 1 is a top plan view of a section of floor covering sheet showing a portion which is decorated with relatively fine lines.
Figure 2:
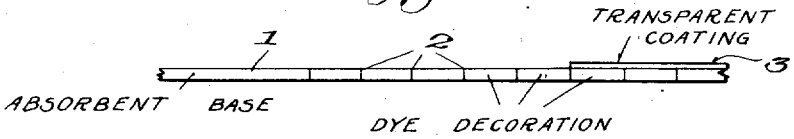
Figure 2 is an edge view of the floor covering shown in Figure 1 illustrating the decorating lines extending downward through the material of the sheet.
Figure 3:
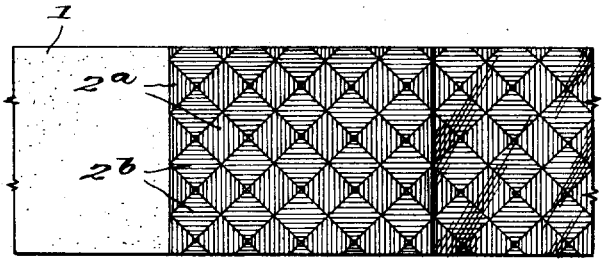
Figure 3 is a view similar to that shown in Figure 1 but showing a modification of the coloring scheme, displaying solid colors arranged in squares.

Referring in detail to the several figures of the drawing, 1 indicates a sheet of unsaturated porous fibrous absorbent material such as paper felt, or any fabric which has sufficent thickness and smoothness to be suited for the purpose. The floor covering felt, such as is commonly saturated with bitumen, is satisfactory if used in its open and unsaturated condition. 2 indicates the decorative coloring material which extends well down into, substantially through, the thickness of the paper felt from top to bottom. This may be applied in lines of different color, as indicated in Figures 1 and 2, or it may be applied in solid colors, as indicated by the Figures 3 and 4, in which the parts $2^a$ represent red and the parts $2^b$ represent blue, thus simulating a tile effect. This coloring effect may be worked out as desired, as for instance, in alternate squares of black and white. 3 indicates an outer transparent wear coat such as may be provided by a coating of a solution of a cellulose ester. In lieu of the cellulose ester coating, any transparent coating of any other material may be added as desired, as for instance a transparent varnish. In lieu of the geometrical figures illustrated in the drawing, the decorations may be of any shape or style. In fact, one of the advantages of this invention is the almost unlimited degree of variation with which decorating effects may be used. It is fully as extensive in its possibilities as are wall paper decorations.

Figure 4:
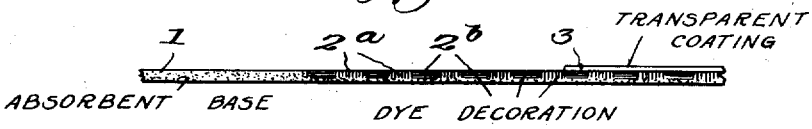
Figure 4 is an edge view of the covering illustrated in Figure 3, showing an example wherein the colors extend into the body of but not completely through the sheet.
Figure 5:
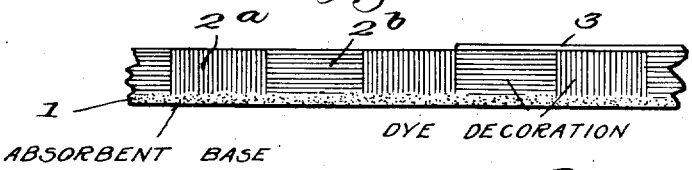
Figure 5 is an enlarged view of a portion of Figure 4.

The material of the colors and decorative effects may extend completely through the thickness of the article as indicated in Fig. 2, or it may extend merely well down into the goods and not quite through the thickness thereof, as represented in Figs. 4 and 5. The degree of penetration, impregnation, depends on the density and absorbability of the material of the sheet when in its original dry porous fibrous condition. Penetration depends also on the thickness of the sheet and on the pressure used when the dye is applied, and also on the amount of and the degree of fluidity of the dye. These factors are within the knowledge of the operator and his control of the procedure may be modified according to conditions. It suffices to emphasize the result that a very considerable thickness of goods is colored or decorated by a penetrating or dye type of color after which the color is sealed in and the material made tough and wear resistant by the saturating filler. Fig. 5 shows a very much enlarged view of a fibrous sheet in which the color does not extend completely through but in which the wearable depth is vastly greater than mere surface decorated material. The saturant filler preferably treats the whole sheet and not merely the colored portion.

In preparing the floor covering of this invention, the untreated and saturated sheet, such as paper felt, is decorated with the desired designs which are so applied with materials in such a state of fluidity that the decorated medium permeates partially or entirely through the thickness of the sheet, impregnating the sheet within the zone to which that particular color or shade is applied. Under some conditions, it may be desirable at times to have the colors blend together, and have one color laid partly over or exactly over another color. Reference has been made hereinbefore to the use of suitable mechanism, not illustrated, which may be used for compressing the sheet and thus to outline the outer margins of the decorated portion, and under such conditions the decorative medium will not spread beyond the specified limits of the zone to be decorated. Where solid colors are applied, a lesser degree of care need be exercised to prevent spreading of the coloring material, and where the designs are delicate and the sheet is relatively thick, then corresponding care must be used in applying the decorative fluid.

The decorative fluid may be made up from paints having the necessary fluidity, but preferably the medium is a dye which is capable of carrying the desired color through the thickness of the sheet without any tendency toward accumulating a filtrate or relatively dense accumulation of pigment on one surface of the sheet.

The next step in the process is drying the sheet of felt or fabric thus decorated. This drying step is relatively speedy and may be accomplished remarkably readily if a dye is used and if oil is not present.

After drying, the sheet is saturated with a solution preferably transparent, capable of impregnating throughout the thickness of the material, and capable of drying by evaporation, as contrasted to oxidation. Such a saturant solution may be made up from a cellulose ester, such as nitrocellulose or acetyl cellulose. One satisfactory solution for the material of the saturant may be made by using 20 parts by weight of dry pyroxylin in a solvent mixture composed of 30 parts by weight of either or both butyl alcohol or amyl acetate plus 30 parts by weight of anhydrous denatured ethyl alcohol. Preferably a drying oil is added and resins and softeners may be incorporated as desired, as for example, as softeners, tricresyl phosphate or diethyl or dibutyl phthalate.

In lieu of the cellulose ester, a vegetable resin or gum may be made the base of the saturant when incorporated with dibutyl phthalate or the like. When the saturant is made up with resins or gums and a plasticizer such as dibutyl phthalate, it may be rendered fluid by heat and while in the melted condition used as a saturant for the decorated sheet of this invention. It may be used hot either with or without the addition of solvents. No claim is made herein specifically to the above identified combination of a resin or gum with a plasticizer since this is the invention of Julian T. Baldwin, assignor to Sandura Company, Inc. and is described and claimed in his applications for patent, two of which have issued as Patents 1,793,666 and 1,793,667, February 24, 1931 and both of which refer to an earlier application, Serial No. 138,897, filed October 1, 1926. Such material is mentioned herein as one example of a suitable saturating agent for treating the decorated non-woven fibrous sheet of this invention. In contrast to a cellulose-ester saturant, it is characteristic of the resin-plasticizer type of saturant that is may be applied hot and solidify upon cooling, or if any solvents are present in the heated mixture it will dry as soon as the solvents evaporate and the material becomes cool.

Other proportions and other materials may be used without departing from the scope of the present invention. It is important, however, that the material of the solvent of the saturant does not act to dissolve the color of the decorative effects before the saturant material dries and loses its liquid and solvent properties. Any tendency toward a dissolving of the color medium may be counteracted by expediting the speed of the saturating action.

In applying the saturant to the dyed material, no particular attention is paid to the nature of the dye, so long as there is a quick drying action. Various combinations of dyes and saturants have been found satisfactory. When either acid or basic water or oil soluble dyes are used, an oil varnish or a cellulose lacquer may be used. A varnish comprising two parts oil and one part of resins or a lacquer comprising equal parts of nitro-cellulose and castor oil thinned down with a solution comprising butyl acetate 5%, ethyl acetate 40% and ethyl alcohol 55%, may be used. Another satisfactory lacquer is one comprising equal parts of cellulose and castor oil thinned down with a solvent comprising ethyl alcohol 85%, ethyl acetate 9%, and toluol 6%.

At no time in this process is there required any long period of drying. The decorated sheet may be dried quickly and the sheet after saturation naturally dries according to the volatility of the solvents used for the cellulose ester, gums or resins as contrasted to the time required to oxidize such material as linseed oil. All of this drying action is relatively speedy as compared to the drying of felt base goods of the bitumen variety which have been decorated with oil paint. In drying bitumen goods, it is not feasible to use high temperatures for fear of causing the bitumen to bleed and thus to discolor the product, whereas no such trouble is encountered with the use of high temperatures in drying the present product in any stage of its manufacture.

After the saturated sheet has been sufficiently dried, it may be further coated, if desired, with an upper transparent coating or wear coat, as indicated at 3, but this coating forms no part of the present invention. It is important, however, because a transparent coating of a cellulose ester material will tend to adhere readily and thus unite with the saturant of the sheet if the latter has been treated with a cellulose ester in solution. A back surfacing of a suitable coating of paint may be applied to the back or under side, as may be desired.

The saturant material renders the floor covering relatively tough, flexible and waterproof as well as resistant to the action of soaps and other detergents. There is no portion of the product which will tend to soften and rot as does the supporting base of linoleum.

The term "color" is used to describe the material of the decoration whether it be ink dye or paint and regardless as to whether it be a true color or white or black. It is an essential of the invention that the decorative medium be such that its color extends uniformly throughout the depth which it penetrates in the saturated sheet, and thus the invention would not be satisfied by the use of a paint which acted to deposit a layer of pigment and did not send its color into the depth of the absorbent base.

No claim is made to the broad idea of saturating floor covering materials with a saturant such as transparent cellulose ester saturating solutions, but it is new to decorate a floor covering paper sheet or other sheet of uniform thickness and ability to absorb with a penetrating decorative medium whether in lines or in solid colors, and thereafter to seal the colors and render the sheet tough and resistant to the wear accorded floor coverings by saturating with a transparent medium. The present invention provides an article adapted to lie directly on the floor and the invention constitutes an improvement over the floor covering desscribed and claimed in my copending application, Serial No. 46,189, filed July 25, 1925, which is now Patent No. 1,729,832, dated October 1, 1929, in which a decorated sheet is supported on a base, and which decorated sheet is treated after much the same process applied to the present sturdier single unitary article.

What I claim is:

1. A floor covering of the smooth surface waterproof type comprising a sheet of fibrous material having designs in decorative coloring visible on at least one face thereof and which designs extend well down into the body of the sheet and tint the fibers but do not fill the voids between the fibers, and a waterproof transparent saturant filling material which has been dried by evaporation filling the voids between the fibers and substantially throughout the thickness of the sheet and providing a smooth tough wear surface displaying said designs.

2. A floor covering of the smooth surface waterproof type comprising a sheet of paper felt having designs in decorative coloring visible on at least one face thereof and which designs extend well down into the body of the sheet and tint the fibers but do not fill the voids between the fibers, and a waterproof transparent saturant filling material which has been dried by evaporation filling the voids between the fibers and substantially throughout the thickness of the sheet and providing a smooth tough wear surface displaying said designs.

3. A floor covering of the smooth surface waterproof type comprising a sheet of non-woven fibrous material characterized by the quality that prior to decoration and toughening it is about as open as a porous felt, said sheet of the completed covering having designs in decorative coloring visible on at least one face thereof and which designs extend well down into the body of the sheet and tint the fibers but do not fill the voids between the fibers, and a waterproof transparent saturant material which has been dried by evaporation in the voids between the fibers and extending substantially thoughout the thickness of the sheet and providing a smooth tough wear surface displaying said designs.

4. A smooth surface waterproof floor covering product comprising a fibrous sheet of even texture substantially throughout, characterized by the quality that prior to decoration and toughening it is about as open as a porous felt, said sheet of the completed covering containing figured decorations in color extending from one surface deep down into the sheet, said decorated sheet containing a waterproof toughening agent applied to the sheet subsequently to the decoration of the sheet and dried by evaporation and penetrated substantially throughout the thickness of the sheet, the decorative and waterproofing material being present between the fibers in the product and the decorations being visible through the toughening agent.

5. A floor covering of the smooth surface waterproof type comprising a sheet of paper felt having designs in decorative coloring visible on at least one face thereof and which designs extend well down into the body of the sheet and tint the fibers but do not fill the voids between the fibers, and a waterproof transparent saturant filling material capable of quickly solidifying after the sheet is saturated thereby and filling the voids between the fibers and substantially throughout the thickness of the sheet and providing a smooth tough wear surface displaying said designs.

6. A floor covering of the smooth surface waterproof type comprising a sheet of paper felt having designs in decorative coloring, visible on at least one face thereof and which designs extend well down into the body of the sheet and tint the fibers but do not fill the voids between the fibers, and a waterproof transparent saturant filling material filling the voids between the fibers and extending substantially throughout the thickness of the sheet and providing a smooth tough wear surface displaying said design.

7. A floor covering comprising a sheet of paper felt having designs in decorative coloring which have been applied at the surface of the sheet and extend well down into the body of the sheet, and the material of which designs tints the fibers in the body of the sheets but does not fill the voids between the fibers, and a waterproof saturant coloring material in the voids between the fibers and extending substantially throughout the sheet and constituting a toughening medium and through which the decorative designs are visible.

8. A floor covering of the smooth surface waterproof type comprising a sheet of fibrous material having designs in decorative coloring visible on at least one face thereof and which designs extend well down into the body of the sheet and tint the fibers but do not fill the voids between the fibers, and a waterproof transparent saturant filling material applied to the sheet subsequently to the decoration thereof and which has been dried by evaporation filling the voids between the fibers and substantially throughout the thickness of the sheet and providing a smooth tough wear surface displaying said designs.

9. A floor covering comprising a sheet of paper felt having designs in decorative coloring which have been applied at the suface of the sheet and extend well down into the body of the sheet, and the material of which designs tints the fibers in the body of the sheets but does not fill the voids between the fibers, and a waterproof saturant filling material in the voids between the fibers dried by evaporation and applied to the sheet subsequently to the decoration thereof and extending substantially throughout the sheet and constituting a toughening medium and through which the decorative designs are visible.

10. A floor covering comprising a sheet of paper felt having designs in decorative coloring which have been applied at the surface of the sheet and extend well down into the body of the sheet, and the material of which designs tints the fibers in the body of the sheets but does not fill the voids between the fibers, and a waterproof saturant filling material in the voids between the fibers capable of quickly solidifying and applied to the sheet subsequently to the decoration thereof and extending substantially throughout the sheet and constituting a toughening medium and through which the decorative designs are visible.

11. A floor covering comprising a sheet of paper felt having designs in decorative coloring which have been applied at the surface of the sheet and are visible there and extend well down into the body of the sheet, the decorated sheet containing toughening material extending substantially throughout the sheet and rendering the decorated sheet waterproof and resistant to wear.

RALPH G. JACKSON.